United States Patent
Ledesma Ballesteros

(10) Patent No.: US 10,945,413 B2
(45) Date of Patent: Mar. 16, 2021

(54) RANDOMLY BOUNCING TOY BALL FOR PETS SUCH AS DOGS AND PRODUCTION METHOD

(71) Applicant: 201 OFICIAL S.A. DE C.V., Mexico City (MX)

(72) Inventor: Rodrigo Ledesma Ballesteros, Col. Santa Anita (MX)

(73) Assignee: 201 OFICIAL S.A. DE C.V., Ciudad de (MX)

( * ) Notice: Subject to any disclaimer, the term of this patent is extended or adjusted under 35 U.S.C. 154(b) by 85 days.

(21) Appl. No.: 16/076,141

(22) PCT Filed: May 3, 2016

(86) PCT No.: PCT/MX2016/000045
§ 371 (c)(1),
(2) Date: Aug. 7, 2018

(87) PCT Pub. No.: WO2017/138805
PCT Pub. Date: Aug. 17, 2017

(65) Prior Publication Data
US 2019/0021287 A1  Jan. 24, 2019

(30) Foreign Application Priority Data

Feb. 8, 2016 (MX) .................. MX/A/2016/001736

(51) Int. Cl.
*A01K 15/02* (2006.01)
*A63B 43/00* (2006.01)
*A01K 5/01* (2006.01)
*A63B 39/00* (2006.01)

(52) U.S. Cl.
CPC .......... *A01K 15/025* (2013.01); *A01K 5/0114* (2013.01); *A63B 39/00* (2013.01); *A63B 43/00* (2013.01); *A63B 2039/003* (2013.01)

(58) Field of Classification Search
CPC .. A01K 15/025; A01K 15/026; A01K 5/0114; A63B 2039/003; A63B 39/00; A63B 43/00
See application file for complete search history.

(56) References Cited

U.S. PATENT DOCUMENTS

| | | | |
|---|---|---|---|
| 10,244,735 B2 * | 4/2019 | Wolfe, Jr. ............ | A01K 15/025 |
| 2006/0134278 A1 * | 6/2006 | Miller .................. | A01K 15/026 426/132 |
| 2007/0289553 A1 * | 12/2007 | Jager .................... | A01K 15/026 119/710 |
| 2014/0261194 A1 * | 9/2014 | Cloutier ............... | A01K 15/025 119/51.01 |

(Continued)

*Primary Examiner* — Trinh T Nguyen
(74) *Attorney, Agent, or Firm* — Polsinelli PC

(57) ABSTRACT

The present invention relates to a hollowed ball with an erratic movement for pets formed by a single piece, preferably made from an elastic material that allows the erratic movement during a rotation or rebound displacement due to its interior design. The form and dimensions and dimensions of the ball allows the storage of food in its interior, introducing and dosing such food through openings or hollows placed in the external part of the ball. The ball is structurally formed in its interior by at least two cylindrical sections with continuing radially arched thickness with a sequential projection of horizontally cylindrical truncated steps.

8 Claims, 2 Drawing Sheets

(56) References Cited

U.S. PATENT DOCUMENTS

2017/0231195 A1\* 8/2017 Dewey ................ A01K 15/026
                                                                      119/707
2017/0295750 A1\* 10/2017 Trottier ................ A01K 5/0233

\* cited by examiner

RANDOMLY BOUNCING TOY BALL FOR PETS SUCH AS DOGS AND PRODUCTION METHOD

FIELD OF THE INVENTION

The present invention is related to the industry of pets' toys manufacturing and more specifically with the manufacturing industry of a hollow ball with an erratic random and irregular movement, that is able to lodge food or treats within the hollow part of the ball and is released when the pet bites of shakes it.

BACKGROUND OF THE INVENTION

Currently there are ball toys used for the grooming, training and feeding of pets, mostly dogs, which have several physical and mechanical characteristics that provides hardness and resistance qualities just like a particular behavior when bouncing due to a launching with a certain amount of strength and distance.

Up until now the ball toys for pets such as dogs has been built with different highly resistant materials ideal for dogs that destroy ball toy. Furthermore, some of these balls can be filled with food such as croquettes, treats or biscuits. The majority of balls made for pets are disposable in a short term, since the material used to build them does not present high resistance qualities, nor they endure a continuous contact of the toy with the domesticated animal or 'pet. On the other hand, the bounce and rebound of the ball maintains predetermined and expected directions, turning the pet's training, grooming and feeding monotonous and with a low level of difficulty for the pets.

The U.S. Pat. No. 6,158,390 "Pet ball" refers to a ball for pets formed by two halves of semispherical members which are hollow and movable throughout a hard surface, for instance, the floor. An element with a defined weight is found suspended in the interior of the ball. The element with a defined weight is suspended by an elastic element, for instance, a rubber band which is fixed to the interior wall of the ball. The element with a defined weight is clamped to the elastic element so that it may move throughout the elastic element or it may be fixed into a static position along the elastic element to create different effects. When a force is applied into the pets' ball, it might roll. When the element with a defined weight is suspended in the elastic element the gravity center of the pet's ball changes in the moment the ball rolls, causing an erratic movement or an undefined path whether direction or pattern wise. Each half of the semispherical hollow member includes an attachment element which extends inwards from its internal walls for the anchoring of the elastic element which is fixed to each attachment member that allows to hold together the two halves of semispherical hollow members in a spherical configuration similar to a ball and allows the two halves of semispherical hollow members to join or separate. Nevertheless, the pets' ball is not created by a single piece that provokes by itself the erratic movement due to its interior design. On the other hand, it doesn't count with a food storage that also allows the introduction and dosage of the food by the means of the gaps placed in the external part of the ball.

The U.S. Pat. No. 6,237,538 "Pet toy ball feeder" refers to a toy for pets' feeding in the shape of a ball formed by two halves of semispherical hollow members. Each half of the semispherical hollow member includes an attachment element that spreads inwards from its internal walls for the anchoring of an elastic element, for instance a rubber band, which is fixed to each of the attachment elements that allows to maintain both halves of the semispherical hollow members together into a spherical configuration similar to a ball and allows the two halves of semispherical hollow members to join or separate from each other. The two halves of semispherical hollow members are united by the means of flexible and resilient projections that extends from one or both halves of the semispherical hollow members inside one or more of the corresponding furrows from each half of the semispherical hollow members. The pets' feeding toy with the shape of a ball includes one or more openings with similar dimensions to those of pets' treats to facilitate its extraction from the toy. However, the pets' ball is not formed by a single piece that provokes by itself the erratic movement due to its interior design. On the other hand, it doesn't count with a food storage that also allows the entrance of air as means of ventilation in the interior of the ball through openings placed in the external part of the ball.

The U.S. Pat. No. 3,995,855 "Toy ball" refers to a toy ball that behaves in an abnormal way regarding its path or trajectory in order for its movement to be erratic. The ball toy includes an exterior ball built with a light weight similar to rubber and an interior ball built with a high bouncing response material. The greater bouncing degree of the interior ball inside the exterior ball provokes the erratic movement. Nevertheless, the pets' ball is not formed by a single piece that provokes by itself the erratic movement due to its interior design. On the other hand, it doesn't count with a food storage that also allows the introduction and dosage of the food by the means of the gaps placed in the external part of the ball.

The U.S. Pat. No. 6,186,095 "Toy ball for animals" refers to a ball toy for animals that includes an exterior ball with a hollowed chamber and at least one defined gap through the chamber. In the interior of the hollowed chamber there is an object which is similar to an interior ball. The interior ball is made from a resilient material. During its manufacture the interior ball is compressed and transferred into the exterior ball until its lodged in the hollowed chamber of the exterior ball. Subsequently the interior ball goes back to its original form and size to prevent it from going out of the exterior ball. However, the pets' ball is not formed by a single piece that provokes by itself the erratic movement due to its interior design. On the other hand, it doesn't count with a food storage that also allows the introduction and dosage of the food by the means of the gaps placed in the external part of the ball.

The U.S. Pat. No. 6,484,671 "Treat dispensing toy" refers to a toy that contains a treat dispenser, a sound recorder and reproducer. The toy includes a ball that has an entrance and an exit. The treats are introduced into the toy through the entrance removing the sound unit. The closing element secures the exit and restrains the exit size. When the sound unit and the closure ring are installed the treats are released from the ball through the exit orifice. The sounds can be recorded by means of the sound recorder. The recorded sounds can be reproduced when the ball is being handled by the user. However, the pets' ball is not formed by a single piece that provokes by itself the erratic movement due to its interior design. On the other hand, it doesn't count with a food storage that also allows the introduction and dosage of the food by the means of the gaps placed in the external part of the ball.

The patents and publications described have as a characteristic an element with a defined weight suspended within the ball to provoke the erratic movement. Furthermore, the balls and/or toys are formed by at least two pieces which has to join or be introduced in order to achieve the erratic movement results.

OBJECTIVE OF THE INVENTION

To have a hollowed ball formed of a single piece preferably with an elastic material that allows the erratic movement during a rotation or rebound displacement due to its interior design.

Another objective is to have a hollowed ball that allows the storage of food in its interior.

Another objective is to have a hollowed ball that also allows the introduction and dosage of food through holes or gaps placed in the external part of the ball.

Another objective is to have a hollowed ball structurally formed in its interior by at least two cylindric sections with thickness, continuing radially arched with a sequential projection of steps horizontally cylindrical truncated.

Additionally, more objectives and advantages of the present invention may become apparent from the study of the present description and the drawings enclosed for illustrative and no limitative purposes.

BRIEF DESCRIPTION OF THE INVENTION

The present invention consists of a hollowed ball with an erratic movement for pets constituted by a single piece, preferably from an elastic material that allows the erratic movement during a rotation or rebound displacement due to its interior design. The shape and dimensions of the ball allows the storage of food in its interior, by introducing and dosing such food through the gaps or holes placed in the external part of the ball. The ball is structurally formed in its interior by at least two cylindric sections with thickness, continuing radially arched with a sequential projection of steps horizontally cylindrical truncated.

DETAILED DESCRIPTION OF THE INVENTION

Figure 1:
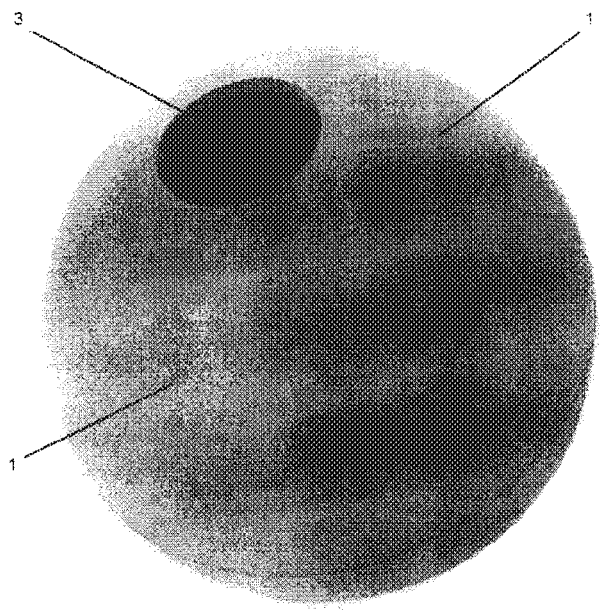
FIG. 1. Shows an exterior view in perspective of the ball.

The present invention consists of a hollowed ball with an erratic movement for pets. The FIG. 1 shows an external view in perspective of the ball formed by a single spherical piece (1) preferably of an elastic material that allows the erratic movement during a rotation or rebound displacement due to its interior design. The interior of the ball is formed by a hollow, cavity or alveolar lodging (3) where the selected food is stored of deposited without limitation among croquettes, biscuits or treats interconnected with at least one gap or hole placed in the external part of the ball. The food is introduced, dosed and extracted by means of at least two gaps or holes placed in the external part of the ball and which are interconnected with the hollow, cavity or alveolar lodging (3). One of the openings has the design and sufficient dimensions for the entrance of air as a mean of ventilation for the ball's interior, and the other opening has the design and sufficient dimensions to introduce dose and extract the food.

Figure 2:
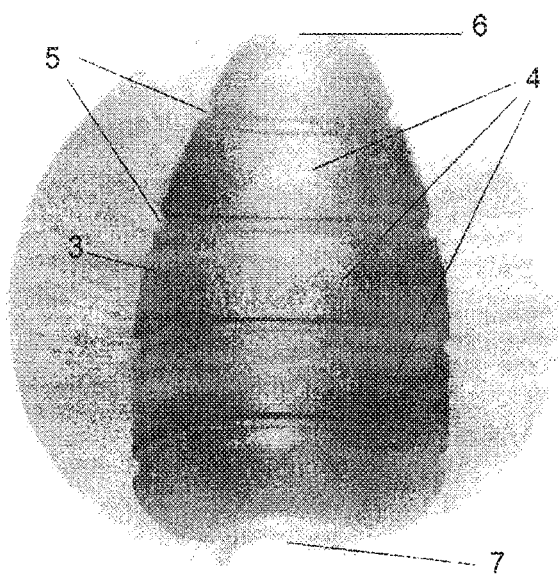
FIG. 2. Shows a side view with a cross section of the ball.

FIG. 2 shows a side view with a cross section of the ball. The ball is structurally formed in its interior mainly if a hollow, cavity or alveolar lodging (3), by at least two cylindric sections (4) with thickness, continuing radially arched with a sequential projection of steps horizontally cylindrical truncated (5), where each step is a radial section increasing its circular periphery perpendicular to such steps where its depth design is appropriate to each step projecting from the lower step to the highest, which are limited in its ends by a structure with a radially concave shape, truncated on both ends prefixed to the conducts or exit from the openings or gaps lower (6) and higher (7) with an radially adequate thickness, marginalized peripherally adapted which defines the cavity or the minor alveolar gap to the other end that defines the cavity or major alveolar gap in relation to the minor gap; the structure that vertically defines the steps are straight horizontal lines ending with a radially adequate thickness in the superior and inferior part that delineates, the structure of the steps which also has an adequate radially marginalized thickness both in the cavity or minor alveolar opening and in the cavity or major alveolar opening.

Figure 3:
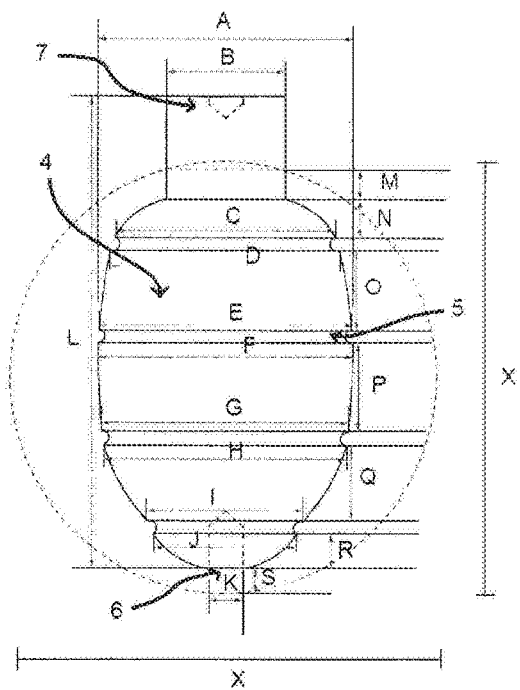
FIG. 3. Shows a frontal view of the mold that defines the hollowed part of the ball.

FIG. 3 shows a frontal view of the mold that defines the hollowed part of the ball. The ball is structurally formed in its interior, mainly in the hollow, cavity or alveolar lodging by at least two cylindric sections (4) with a continuing radially arched thickness (O, P, Q) with a sequential projection of horizontally truncated cylindric steps (5), where each step is a radial section increasing its perpendicular circular periphery to such steps, where the design of its depth is adequate in each step projecting itself from the minor to the major step, which are limited in their endings by a structure with a truncated radially concave shape in both endings (C, J) upstreaming to the conducts or exit of the openings or holes minor (6) and major (7) with an adequate radially thickness (M, R) projected from the internal part of a radially marginalized thickness circular peripherally adjusted of a proper thickness which limits the cavity or minor alveolar hollow (K) to the other ending that limits the cavity or major alveolar hollow (B) in relation to the minor, the structure that vertically defines the steps are horizontal lines ending with a proper radial thickness for the superior and inferior parts it defines, the structure of the steps also having a proper radially marginalized thickness both of the cavity or minor alveolar hollow as for the cavity or major alveolar hollow.

The diameter of the followed ball (X) can be chosen without limiting among 40 mm and 150 mm, preferably 60 mm, even more preferably 70 mm; even more preferably 80 mm, even more preferably 100 mm. The opening or minor hollow (6) can be chosen but without limiting a proportion between 5% and 15%, preferably 8% in relation with the diameter of the hollowed ball (X). The opening or major hollow (7) can be chosen but without limiting in a proportion between 15% and 35%, preferably 28% in relation to the diameter of the hollowed ball (X).

The hollow, cavity or alveolar lodging is formed by at least two cylindric sections. FIG. 3 shows five cylindric sections. The inferior cylindrical minor section which defines the opening or minor hollow (6) has a smaller diameter (K) equal to the opening diameter of the opening or minor hollow (6) and a bigger diameter (J) that may be chosen, but without limiting between 25% and 40% regarding the hollow ball's diameter (X), preferably 33.6%. The intermediate cylindric inferior section that defines the inferior cylindric minor section and the major cylindric section have a smaller diameter (I) that may be chosen but without limiting between 30% and 45% regarding the hollow ball's diameter (X) preferably 36.9% and a major diameter that may be chosen, but without limiting between 45% and 62% regarding the hollow ball's diameter (X) preferably 57%. The major cylindric section that defines the intermediate cylindric inferior section and the intermediate cylindric superior section have a smaller diameter (G) that may be chosen but without limiting between 50% and 65% regarding the hollow ball's diameter (X) preferably 58% and a major diameter (F) that may be chosen but without limiting between 55% and 65% regarding the hollow ball's diameter (X) preferably 60%. The intermediate cylindric superior section that defines the major cylindric section and the superior cylindric minor section have a minor diameter that may be chosen but without limiting between 55% and 65% regarding the hollow ball's diameter (X) preferably 60% and a minor diameter (D) that may be chosen but without limiting between 50% and 65% regarding the hollow ball's diameter (X) preferably 54%. Finally The superior cylindric minor section that defines the opening or major hollow (7) has a minor diameter equal to the diameter of the opening or mayor hollow (7) and a major diameter (C) that may be chosen but without limiting between 45% and 60% regarding the hollow ball's diameter (X) preferably 51.5%.

Figure 4:
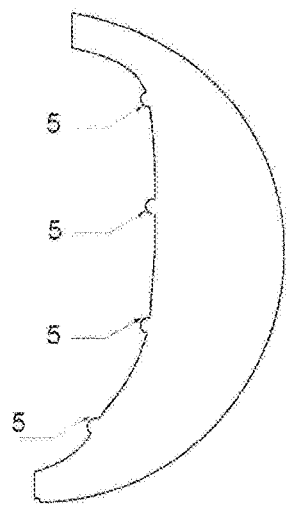
FIG. 4. Shows a frontal view with a cross section of the ball.

FIG. 4 shows a frontal view with a cross section of one half of the ball that shows a sequential projection of horizontally cylindric truncated steps (5). The hollow ball has at least two horizontally cylindric truncated steps (5).

Some of the advantages of the present invention are:

The structure in a single piece of the hollowed ball eliminates the need of counting with attachment elements for the anchoring of an elastic member that lodges an element with a defined weight that provokes the erratic movement due to its interior design.

The structure in a single piece of the hollowed ball eliminates the need of counting with two halves of semispherical members that require to be united to form a spherical ball.

The internal structure of the hollowed ball allows to increase or reduce the erratic movement accordingly with the amount and dimensions of the cylindric sections with a radially continuing arched thickness with a sequential projection of horizontally cylindric truncated steps that constitutes the hollow of the ball.

It's stated that the best method known by the applicant to carry out the invention is that which results from the present description.

Having described the invention, its considered as an innovation and therefore the aforementioned its claimed as property in the following demand clauses:

1. A hollowed ball with an erratic movement for pets that allows the erratic movement during a rotation or rebound displacement due to its interior design that comprises:
   a. A hollow, cavity or alveolar lodging
   b. At least two openings or hollows placed in the external part of the ball which interconnects with the hollow cavity or alveolar lodging, wherein the hollowed ball with an erratic movement for pets is formed by a single spherical piece, and wherein the form and dimensions of the hollow, cavity or alveolar lodging is structurally arranged inside by at least two continuous radially arched thick cylindrical sections with a sequential projection of horizontally cylindrical steps, each step being a radial section, increasing its circular periphery perpendicularly to such steps, and wherein one of the openings or hollows is an opening or minor hollow that has a proportion between 5% and 15% and the other one of the openings or hollows is an opening or major hollow that has a proportion between 15% and 35% relative to the diameter of the hollowed ball.

2. The hollowed ball with an erratic movement for pets accordingly with claim 1, wherein food is stored in the hollow, cavity or alveolar lodging.

3. The hollowed ball with an erratic movement for pets accordingly to claim 2, wherein the food is selected from the group of croquettes, biscuits and treats.

4. The hollowed ball with an erratic movement for pets accordingly to claim 1, wherein one of the openings or hollows has a design and sufficient dimensions for the entrance of air as mean for ventilation inside the ball and the other opening has a design and sufficient dimensions to introduce dose and extract food.

5. The hollowed ball with an erratic movement for pets accordingly to claim 1, wherein the diameter of the hollowed ball is between 40 and 150 millimeters.

6. The hollowed ball with an erratic movement for pets accordingly to claim 1, wherein the dimensions of the cylindric sections with a continuing radially arched thickness with a sequential projection of horizontally cylindrical truncated steps that constitutes the hollow, cavity or alveolar lodging is between 25% and 65% relative to the diameter of the spherical hollowed ball.

7. The hollowed ball with an erratic movement for pets accordingly to claim 1, wherein the dimensions of the cylindric sections with a continuing radially arched thickness with a sequential projection of horizontally cylindrical truncated steps that constitutes the hollow, cavity or alveolar lodging is between 25% and 65% relative to the diameter of the spherical hollowed ball.

8. The hollowed ball with an erratic movement for pets accordingly to claim 1, wherein the single spherical piece is formed from an elastic material.

* * * * *